(12) United States Patent
Beleznai et al.

(10) Patent No.: US 12,007,247 B2
(45) Date of Patent: Jun. 11, 2024

(54) CREATION AND UPDATING OF MAPS IN THE OFF-STREET AREA

(71) Applicant: Robert Bosch GmbH, Stuttgart (DE)

(72) Inventors: Csaba Beleznai, Vienna (AT); Christian Matthies, Stuttgart (DE); Manuel Maier, Singapore (SG); Michael Wolf, Stuttgart (DE); Patrik Zips, Vienna (AT)

(73) Assignee: ROBERT BOSCH GMBH, Stuttgart (DE)

( * ) Notice: Subject to any disclaimer, the term of this patent is extended or adjusted under 35 U.S.C. 154(b) by 380 days.

(21) Appl. No.: 17/273,196

(22) PCT Filed: Oct. 30, 2019

(86) PCT No.: PCT/EP2019/079663
§ 371 (c)(1),
(2) Date: Mar. 3, 2021

(87) PCT Pub. No.: WO2020/099132
PCT Pub. Date: May 22, 2020

(65) Prior Publication Data
US 2021/0325206 A1    Oct. 21, 2021

(30) Foreign Application Priority Data
Nov. 12, 2018 (DE) .......................... 102018219220.0

(51) Int. Cl.
*G01C 21/00* (2006.01)

(52) U.S. Cl.
CPC ..... *G01C 21/3841* (2020.08); *G01C 21/3807* (2020.08); *G01C 21/3848* (2020.08); *G01C 21/3867* (2020.08)

(58) Field of Classification Search
CPC ............ G01C 21/3841; G01C 21/3807; G01C 21/3848; G01C 21/3867; G06F 18/25;
(Continued)

(56) References Cited

U.S. PATENT DOCUMENTS

2012/0095682 A1  4/2012  Wilson
2015/0057926 A1  2/2015  Gupta et al.
(Continued)

FOREIGN PATENT DOCUMENTS

CN    106489173 A    3/2017
CN    107727066 A    2/2018
(Continued)

OTHER PUBLICATIONS

International Search Report for PCT/EP2019/079663, Issued Feb. 19, 2020.
(Continued)

*Primary Examiner* — Anne Marie Antonucci
*Assistant Examiner* — Jewel Ashley Kuntz
(74) *Attorney, Agent, or Firm* — NORTON ROSE FULBRIGHT US LLP; Gerard A. Messina

(57) ABSTRACT

A method for creating a map of at least one parking infrastructure. Unoccupied parking spaces inside the parking infrastructure are registered. Items of path information and items of environmental information are received by an external server unit. Items of path information are subdivided into path segments. The path segments are rectified by the external server unit. A loop recognition is carried out in order to create a geometrical map of the parking infrastructure. On the basis of the items of environmental information, occupied and unoccupied parking spaces along the path are acquired in order to ascertain unoccupied parking spaces inside the parking infrastructure. An external server unit and a system are also described.

11 Claims, 9 Drawing Sheets

(58) Field of Classification Search
CPC .. G08G 1/0112; G08G 1/0129; G08G 1/0141; G08G 1/04; G08G 1/096827; G08G 1/09685; G08G 1/143; G08G 1/147; G08G 1/148

See application file for complete search history.

(56) References Cited

U.S. PATENT DOCUMENTS

2017/0059328 A1    3/2017  Dousse et al.
2019/0063947 A1*   2/2019  Beaurepaire ....... G01C 21/3423

FOREIGN PATENT DOCUMENTS

| CN | 107787283 A | 3/2018 | |
| DE | 102009039086 A1 | 3/2011 | |
| DE | 102012216994 A1 * | 3/2014 | ......... G01C 21/3685 |
| DE | 102012216994 A1 | 3/2014 | |
| DE | 112014000532 T5 | 10/2015 | |
| DE | 102014217900 A1 | 3/2016 | |
| DE | 102015207804 A1 | 11/2016 | |
| EP | 2825902 A1 | 1/2015 | |
| EP | 3136054 A1 * | 3/2017 | ........... G01C 21/165 |
| EP | 3136054 A1 | 3/2017 | |
| JP | 2013015735 A | 1/2013 | |
| JP | 2018081252 A | 5/2018 | |
| KR | 20060003196 A | 1/2006 | |
| WO | 2013138183 A1 | 9/2013 | |

OTHER PUBLICATIONS

Schwesinger, Ulrich, et al., "Automated Valet Parking and Charging for E-Mobility", 2016 IEEE Intelligent Vehicles Symposium (IV), IEEE, 2016, pp. 157-164.

* cited by examiner

Fig. 2
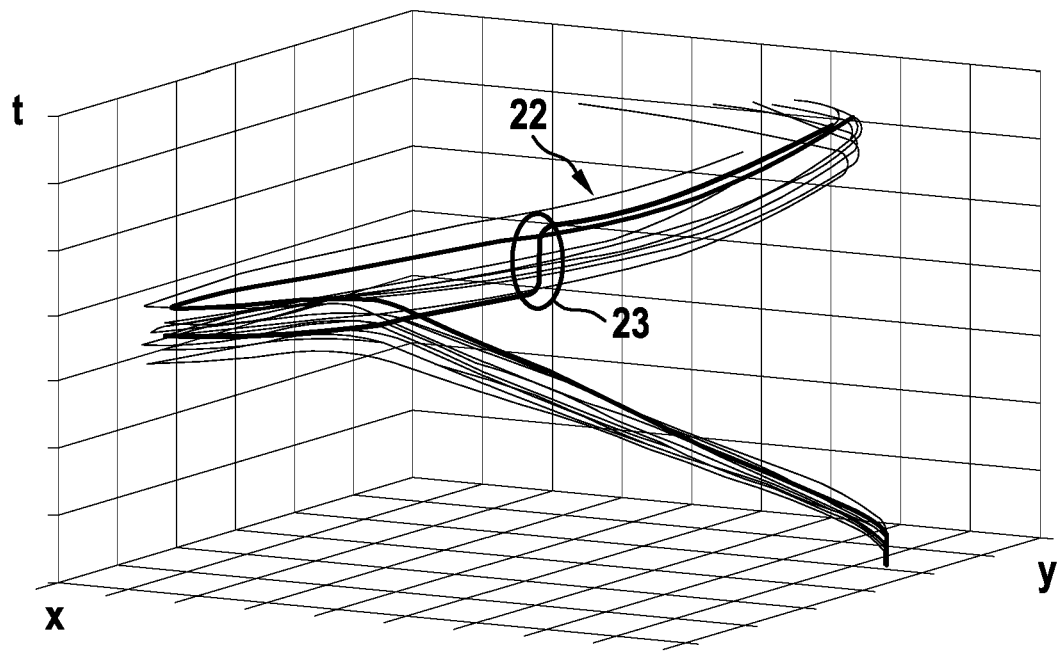
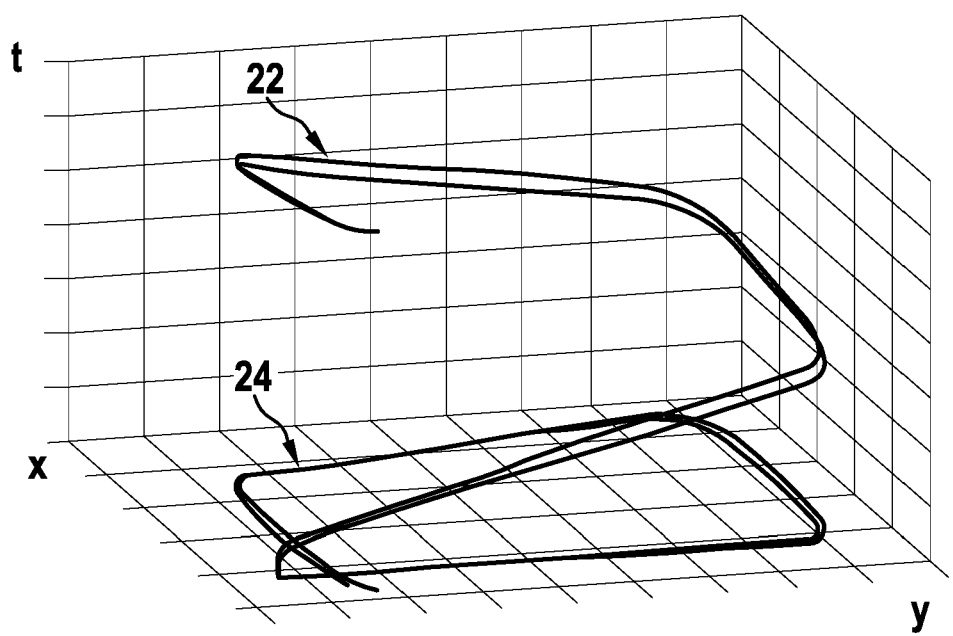

Fig. 5
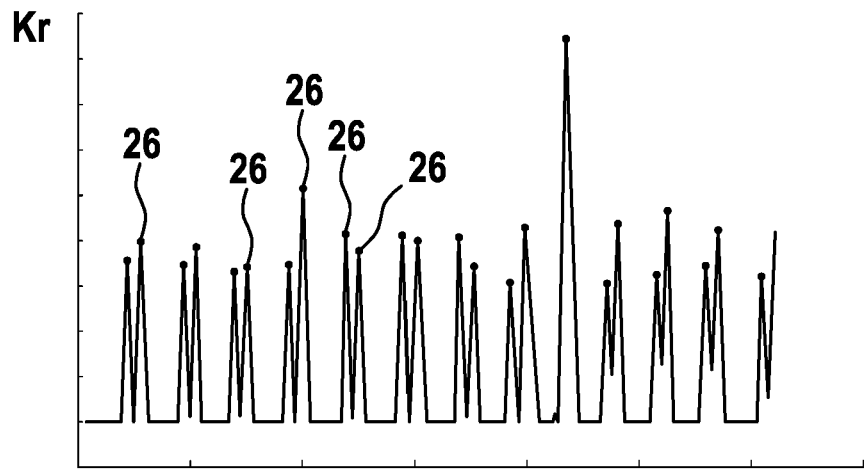
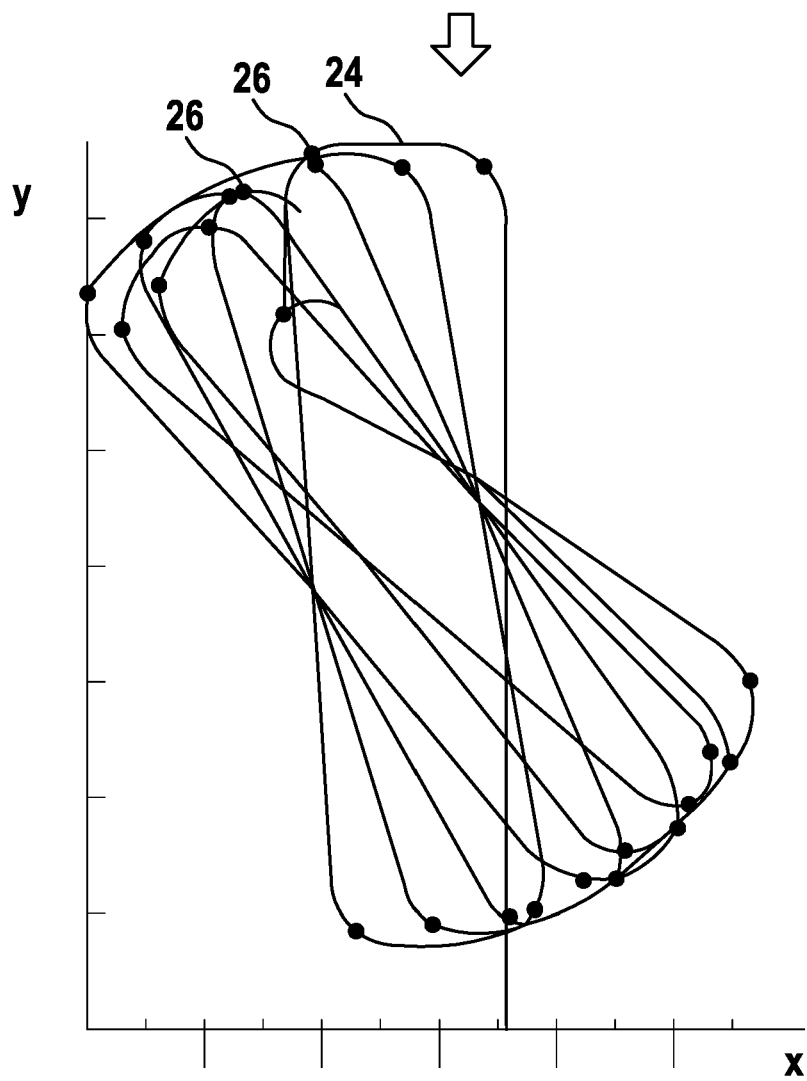

CREATION AND UPDATING OF MAPS IN THE OFF-STREET AREA

FIELD

The present invention relates to a method for creating a map of at least one parking infrastructure through a server unit, an external server unit, and a system.

BACKGROUND INFORMATION

Crowdsourcing-based services in the area of maps and user interfaces are becoming increasingly important in the automobile industry. This development is due for example to the increasing use of sensors in vehicles. Currently available services based on a crowdsourcing approach are aimed at parking procedures, creating friction maps, and creating maps for highly automated driving functions.

In these services, sensor data are collected by the vehicle sensor systems of so-called sender vehicles and are transmitted to a server unit or cloud. The sensor data are then processed in order to provide the services. Vehicles or drivers can access the provided services. The users of the services are classified as receiver vehicles.

Previous solutions in this area relate mainly to the so-called on-street area. In this way, the position of the vehicle can in most cases be precisely determined via GPS sensors, and used for example to create parking space maps of parking spaces along the side of roadways. In the so-called off-street area, the use of GPS sensors is, generally, not possible, and as a result a locationally precise allocation of sensor data can be problematic.

SUMMARY

An object of the present invention is to provide a method for creating maps in the off-street area.

This object may achieved in accordance with the present invention. Advantageous embodiments of the present invention are described herein.

According to an aspect of the present invention, a method is provided for creating a map of at least one parking infrastructure by a server unit. In accordance with an example embodiment of the present invention, unoccupied parking spaces are registered inside the parking infrastructure, items of path information and environmental information ascertained by a vehicle sensor system of at least one vehicle being received by the external server unit. The items of path information are divided into path segments. In a further step, the path segments are rectified by the external server unit in order to compensate errors. The rectified path segments are used to create or update a geometrical map of the parking infrastructure. Based on the environmental information and based on the rectified path segments, occupied and unoccupied parking spaces along the path are acquired in order to ascertain unoccupied parking spaces inside the parking infrastructure.

According to an advantageous embodiment of the present invention, a method is provided for the collection of sensor data by at least one vehicle. The vehicle has a control device and a vehicle sensor system. The vehicle sensor system ascertains sensor data that include items of path information and environmental information about a path of the vehicle. The path information and the environmental information are sent to an external server unit. According to an advantageous embodiment, a control device is provided for receiving and evaluating sensor data of a vehicle sensor system, the control device being set up to carry out the method for collecting sensor data.

According to a further aspect of the present invention, an external server unit is provided, the external server unit being set up to carry out all steps of the method for creating a map of at least one parking infrastructure.

According to a further aspect of the present invention, a system is provided having at least one vehicle and having at least one server unit. In accordance with an example embodiment of the present invention, the at least one vehicle has a vehicle sensor system having at least one environmental sensor and having at least one odometer. The at least one vehicle has a control device that is connected in data-conducting fashion to the vehicle sensor system, and is set up to evaluate the sensor data of the vehicle sensor system.

In particular, in cities, looking for parking spaces causes a high volume of traffic, and can prolong the time needed to travel a route. This parking search traffic can be divided into an on-street area, or street edge, and an off-street area, or parking lots. A primary case of use of community-based parking was previously in the on-street area in cities. The off-street area is partly digitized, so that for example occupancy data can be ascertained via barrier systems, automated payment machines, and corresponding sensor systems.

Using a method in accordance with an example embodiment of the present invention, the state of occupancy of parking infrastructures, such as parking lots, parking garages, below-ground parking garages, and the like can be ascertained, and at the same time a map can be ascertained of the infrastructure as well as of the state of occupancy of the parking infrastructure. In particular, static and dynamic infrastructure data can be ascertained using sensor data of vehicles when traveling in the respective infrastructure. The static infrastructure data can include for example a geometrical shape of the infrastructure. The dynamic infrastructure data correspond to a changing state of occupancy, and can include data subject to modification, such as construction sites or blocked areas.

Through the example method for creating a map of at least one parking infrastructure and for collecting sensor data via at least one vehicle, an installation, and thus a networking of the infrastructure on location, can be omitted. In this way, the costs for the construction and operation of a parking infrastructure can be reduced. In particular, the provision of the state of occupancy and of the parking infrastructure maps can be done by a service provider. In this way, an interface can be provided between a parking infrastructure and vehicle drivers. Such a solution can also be adapted to modifications, such as for example a newly erected parking infrastructure or expansion of a parking infrastructure, without additional outlay.

The respective sensor data about the static and dynamic information of the infrastructure can be obtained by vehicle sensors without having access to the data of the infrastructure itself, such as the barrier systems, payment systems, ground sensors, or roof sensors.

In addition, the method can make use of the data sets, or sensor data from ultrasound systems, already defined for the on-street area.

In the methods according to example embodiments of the present invention, in a possible first step the items of path information ascertained by sensor data that are dependent on a time are locationally normalized. In this way, the time information is removed from the items of path information, resulting in only the coordinates traveled through in a two-dimensional space.

Based on the normalized path information, points having maximum curvature are determined. This can take place by scanning the overall path. In this way, the turning processes are identified. These points of maximum curvature are used as cut points for dividing the path into a plurality of path segments. In this way, the further processing or adaptation of the path information can be facilitated.

Subsequently, a rectification of the path segments takes place. At the same time, a loop recognition can be carried out, because the vehicles usually enter and depart from a parking infrastructure at the same, or similar, location. Thus, a parking garage entrance can be defined as the start and destination of the paths. The rectification of the path segments can be carried out using a spatial transformation; here in particular irregularities and systematic errors of odometry data, such as wheel slippage, are compensated. The rectification can be carried out with the goal of positioning the starting point and the destination point of the path adjacent to one another, thus essentially forming a closed loop. In this way, a geometric map of the parking infrastructure can already be created.

Based on the sensors installed in the vehicle, the surrounding environment of the vehicle can be scanned when the vehicle enters on the path inside the parking infrastructure. In this way, environmental information can be obtained that, alongside statistical data, also includes dynamic data such as parking vehicles. In this way, the stationary vehicles situated in the surrounding environment of the vehicle can be identified. On the basis of the dimensions of the vehicles, parking spaces that are already occupied or unoccupied can be determined. In this way, a possibility can be provided for the flexible and infrastructure-independent ascertaining of a state of occupancy of a parking infrastructure. Alternatively or in addition, the ascertaining of the state of occupancy can be carried out in the context of a loop recognition.

The ascertained free and occupied parking spaces can be stored in a memory of a vehicle-internal control device, or in a vehicle-external server unit, together with the geometrical map of the parking infrastructure. The stored data are subsequently provided to other traffic participants, or are further processed.

According to a specific embodiment of the present invention, in the items of path information points having maximum curvature are ascertained, and the items of path information are subdivided into approximately linear path segments that are bounded by the points of maximum curvature. In this way, each path can be divided into defined path segments, thus simplifying a further evaluation and optimization of the path information. The respective steps, for example for rectifying or normalizing the path information, can thus be calculated or carried out segment-by-segment.

According to a specific embodiment of the present invention, a position of an entrance to the parking infrastructure is ascertained, the items of path information being adapted to the position of the entrance in such a way that the items of path information begin at the position of the entrance. Through such a normalization, or norming, of the sensor data, the sensor measurement data can be made comparable with regard to the path traveled by a plurality of vehicles. Through such a norming, the sensor measurement data of a plurality of vehicles can be used to create the infrastructure map and the occupancy map with a higher degree of precision through redundant measurements. The norming can take place temporally and/or locally.

In particular, the positions of the entrance and/or of the exit of the parking infrastructure can be determined and can be adapted to a position that is absolute or is redundantly ascertained, for example by GPS sensors, of the entrance and/or exit. The position information here can likewise be adapted corresponding to the adaptation of the endpoints that represent the entrance position and the exit position.

According to a further specific embodiment, the maximum curvature is ascertained by scanning the items of path information using a circle, a path of the path information being routed through a circle midpoint, and two vectors, between an entry point of the path into the circle and the circle midpoint and between the circle midpoint and an exit point of the path from the circle, being used to ascertain the maximum curvature. The curvature can be determined based on the angle between the two vectors. Curvature ascertained over an entire path length forms maxima at defined points, such as curves, that can be used to divide the path into path segments.

According to a further specific embodiment of the present invention, the rectification of the path segments is carried out on the basis of geometrical regularities of a plurality of items of path information, the points of maximum curvature being defined as turning points having an angle, and being used to rectify the path segments.

The distortion of the path information can arise in particular in curves in which the wheels of the vehicle rotate unequally. Here, the orientation of adjacent path segments can be compared to one another. The comparison takes place with regard to orthogonal and parallel configuration of the path segments to one another, whereby the orientation of the path segments is adapted/corrected to the geographical features of the surrounding environment.

According to a further specific embodiment of the present invention, based on the ascertained occupied and unoccupied parking spaces along the path of the at least one vehicle, changes in a parking space level are determined and are taken into account in the creation or updating of the map. The parking spaces, and thus the possible distribution of the vehicles inside the parking infrastructure, are standardly regularly marked on the vertical levels of the parking infrastructure. Through the determination of such regularities, changes of level in the environmental information can be identified, and in this way a change in height in the course of the path of the vehicles can be formed.

According to a further specific embodiment of the present invention, the path information is ascertained through odometry measurement of the vehicle. Because in the off-street area the use of GPS sensors is usually limited, the paths traveled by vehicles, or the path information, can be ascertained based on odometer data. In this way, a spatial item of relative information can be assigned to the items of environmental information.

According to a further exemplary embodiment of the present invention, ascertained items of environmental information from a plurality of vehicle sensors are fused by calculating similarity measures. In this way, messages can be confirmed and uncertainty in the measurements can be compensated. For example, for the assessment of a plurality of items of environmental information, such as position and size of parked vehicles, the Jaccard coefficient can be ascertained.

According to a further exemplary embodiment of the present invention, a plurality of items of path information are combined with one another at points of maximum curvature. The segment-by-segment combination of the path segments can be carried out more precisely and faster. In this way, the accuracy of the created maps of the parking infrastructure can be increased as the number of measurements by vehicles increases.

According to an example embodiment of the present invention, the ascertained geographical map and the ascertained free parking spaces are made available for retrieval by further traffic participants. In this way, the information can be stored in the context of services provided, and can be provided to receiver vehicles as well as to parking infrastructure operators.

In the following, preferred exemplary embodiments of the present invention are explained in more detail on the basis of highly simplified schematic representations.

BRIEF DESCRIPTION OF THE DRAWINGS

FIG. 2 shows a schematic diagram illustrating a spatial normalization of items of path information, in accordance with an example embodiment of the present invention.

FIG. 5 shows a schematic diagram having an ascertained curvature along a plurality of paths, and the position of the points of maximum curvature on the spatially normalized paths, in accordance with an example embodiment of the present invention.

DETAILED DESCRIPTION OF EXAMPLE EMBODIMENTS

Figure 1:
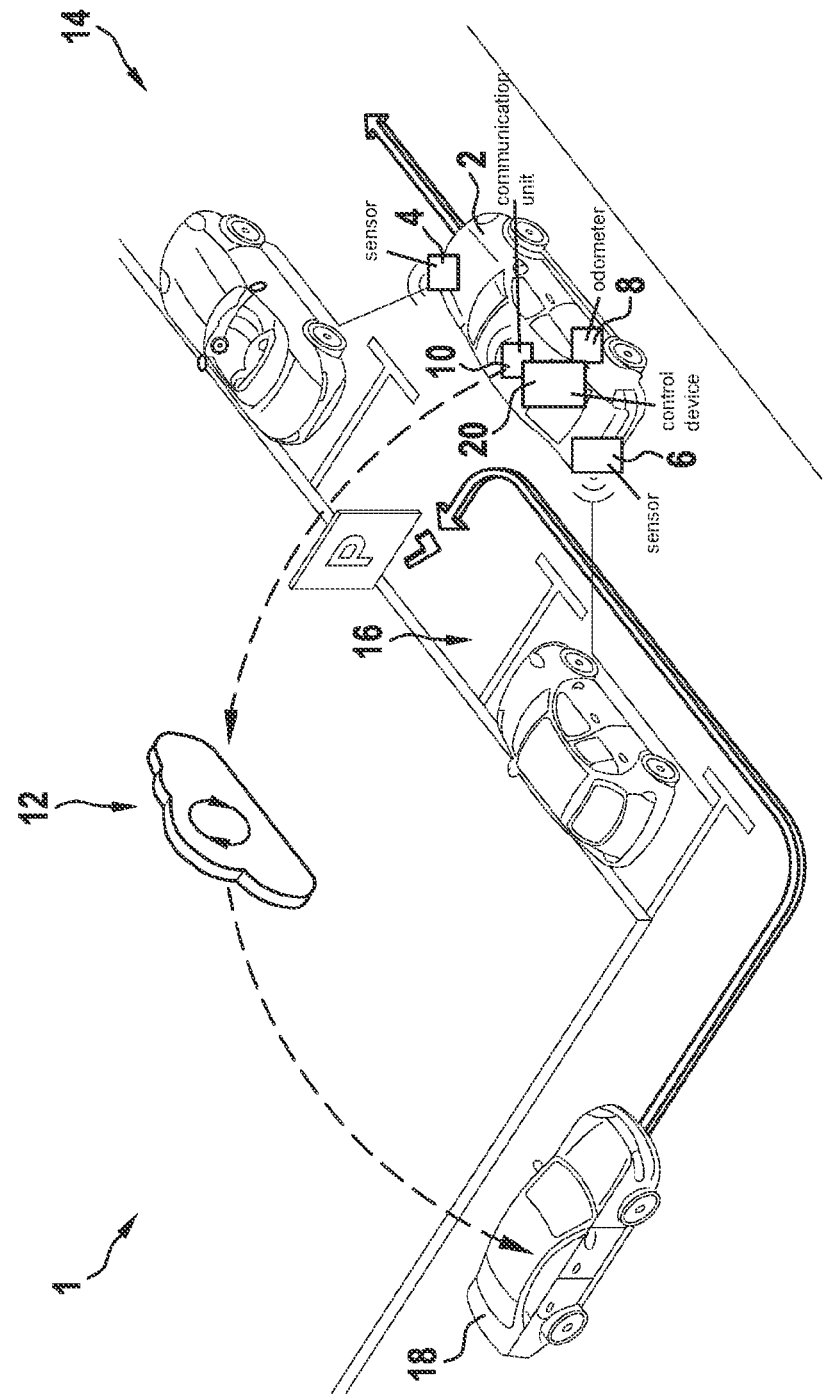
FIG. 1 shows a schematic representation of a system according to a specific example embodiment of the present invention.

FIG. 1 shows a schematic representation of a system 1 according to a specific embodiment of the present invention.

System 1 has at least one vehicle 2 that is realized as a sending vehicle and is used to collect sensor data. According to the exemplary embodiment, vehicle 2 has a vehicle sensor system having two depicted ultrasound sensors 4, 6. In addition, vehicle 2 has an odometer 8 that is used to collect path information. In addition, the vehicle sensor system can include lidar sensors, radar sensors, camera sensors, and the like.

Via a communication unit 10, vehicle 2 can communicate with an external server unit 12 and can transmit the ascertained sensor data. Based on the transmitted sensor data, external server unit 12 can create geometrical maps and occupancy maps of a parking infrastructure 14. In FIG. 1, as an example an on-street situation is shown in which a free parking space 16 has been ascertained by vehicle 2. Free parking space 16 is provided to other vehicles 18, the so-called receiver vehicles, via external server unit 12.

In addition, vehicle 2 has a control device 20 that is designed to read out the sensor data of ultrasound sensors 4, 6 and of odometer 8 and to buffer them at least temporarily. Depending on the embodiment, control device 20 can partly or completely evaluate the sensor data before they are sent to server unit 12 via communication unit 10.

In the following, FIGS. 2 through 11 are described in order to illustrate an example method according to the present invention. The respective steps of the method can be carried out one after the other in the described sequence or independently of one another.

FIG. 2 shows a schematic diagram illustrating a spatial normalization of path information 22 that was ascertained by odometer 8. The original items of path information 22 are in the form of coordinates in an x-y plane, and include an item of temporal information t that determines a height of the respective diagram. Items of path information 22 are normed in a step in which temporal information t is removed. This yields normed items of path information 24 in the two-dimensional x-y plane.

Through the norming, temporal jumps 23, which occur for example when vehicle 2 stops, can be compensated.

Figure 3:
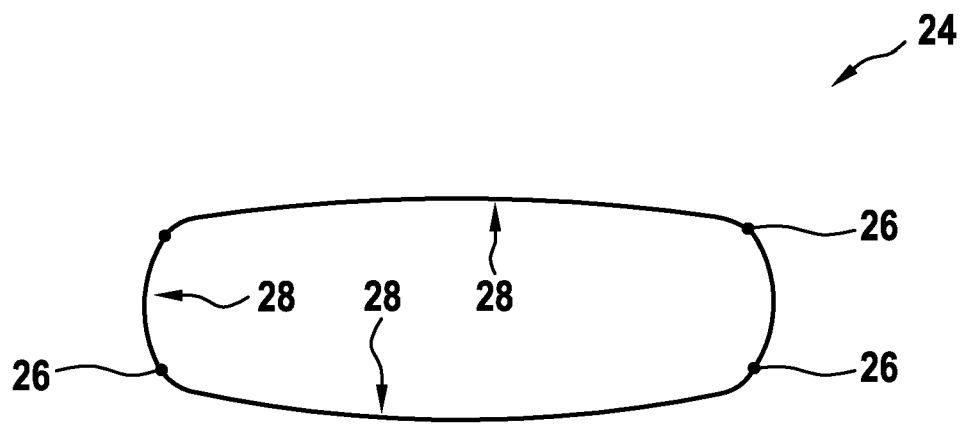
FIG. 3 shows a schematic representation of a spatially normalized and rectified path illustrating points of maximum curvature, in accordance with an example embodiment of the present invention.

A further step of the method is shown in FIG. 3, in a schematic representation of a spatially normalized and rectified path 24 illustrating points of maximum curvature 26. Points 26 are used as separating points for the division of path 24 into separate, approximately straight, path segments 28 that are connected to one another at the points 26.

Figure 4:
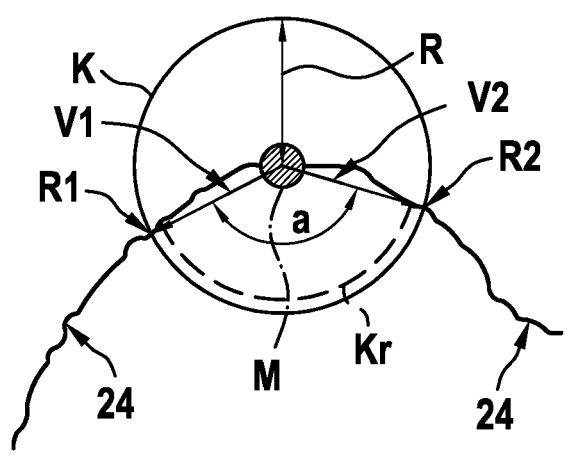
FIG. 4 shows a schematic representation of a circle for ascertaining a curvature, in accordance with an example embodiment of the present invention.

FIG. 4 shows a schematic representation of a circle K for ascertaining a curvature Kr at arbitrary positions along path 24. Circle K has a midpoint M, from which two vectors V1 and V2 point to a circle edge R1, R2. Points R1, R2 are determined by an entry point R1 and an exit point R2 of path 24 into and out of circle K. The angle a between the two vectors V1, V2 can be used to calculate the curvature Kr, via the following relation:

$$Kr=0.5*(\cos(a)+1)$$

Based on this relation, all paths 24 ascertained by vehicles 2 can be scanned for points of maximum curvature 26. In addition to the presence of corresponding maxima 26, the distribution of curvature maxima 26 can also be relevant. This can be seen in FIG. 5, which shows a schematic diagram having ascertained curvature Kr along a plurality of paths 24, and shows the position of the points of maximum curvature 26 on the spatially normalized paths 24.

Figure 6:
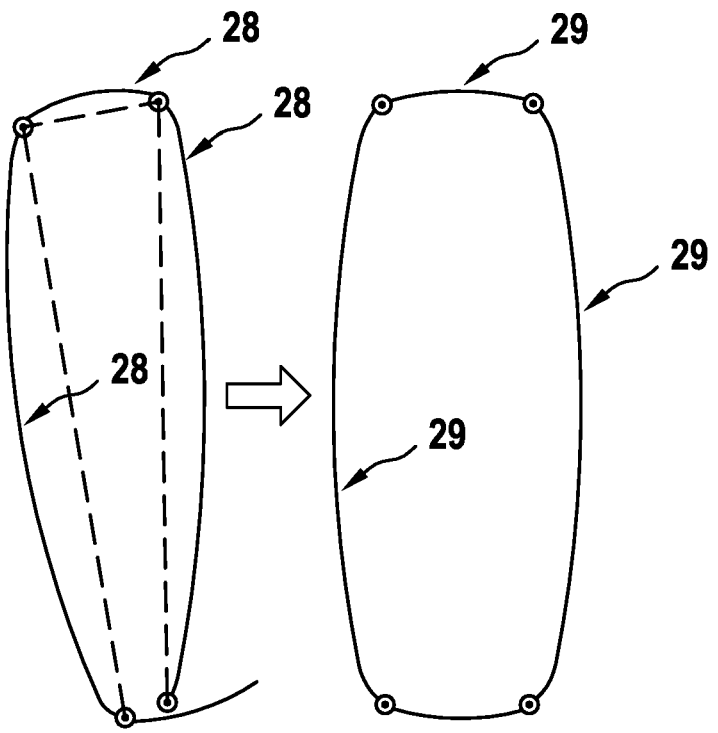
FIGS. 6-8 show schematic representations illustrating the functioning of a rectification of path segments, in accordance with an example embodiment of the present invention.
Figure 7:
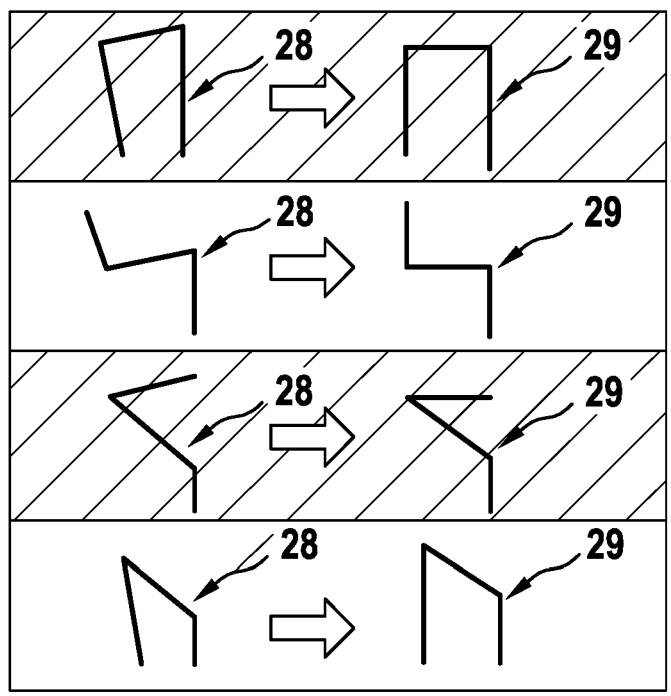
Figure 8:
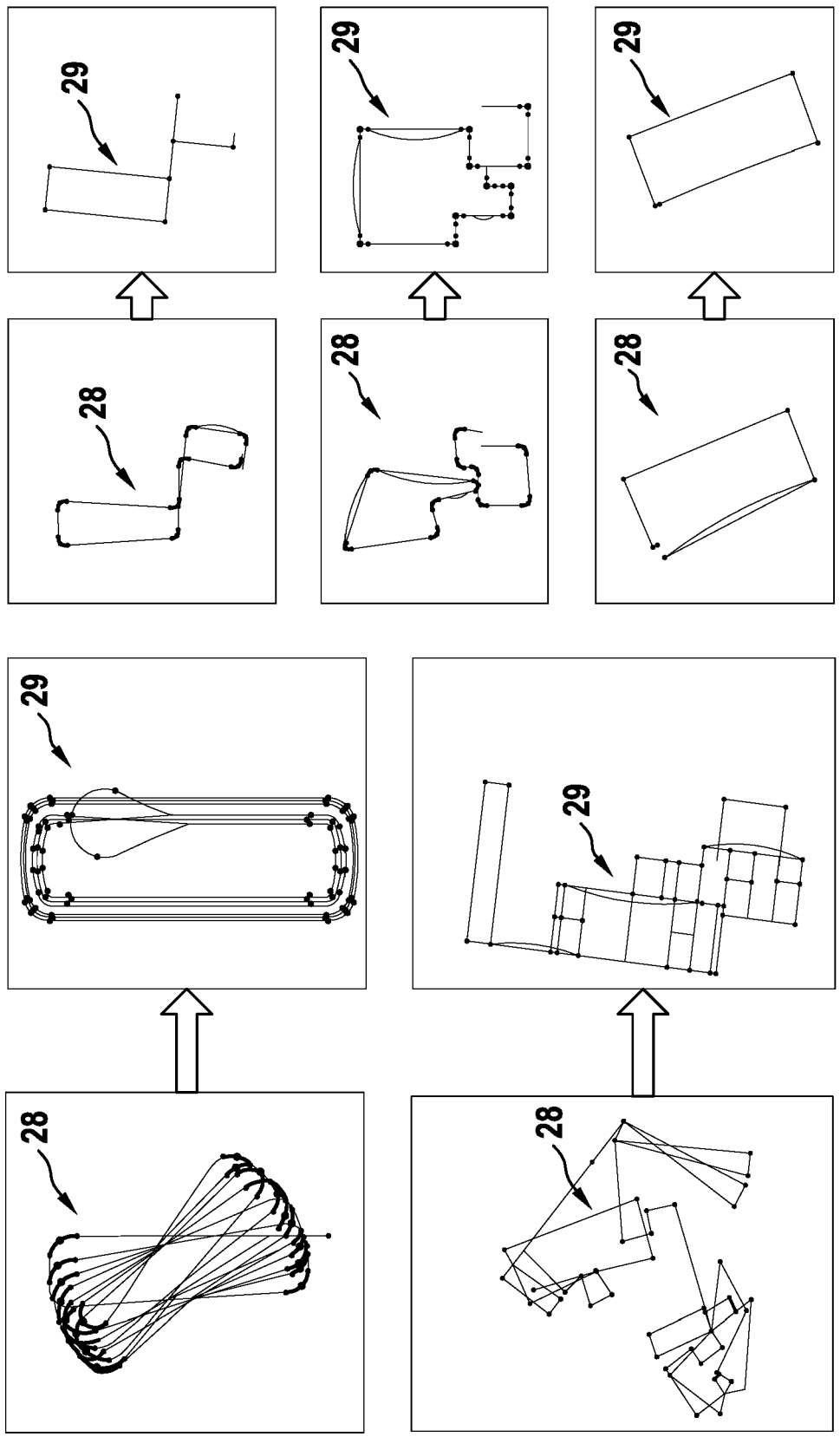

In FIGS. 6-8, schematic representations are shown illustrating the functioning of a rectification of path segments 28. The rectification is a further possible step of the method.

On the basis of the functional dependence of odometer 8 on the rotation of the wheels, such odometers 8 can, when traveling through curves, develop measurable deviations that result in a distorted representation of paths 24. In order to rectify such deviations, the orientations of at least two path segments 28 are compared. Here it is assumed that path segments 28 correlate with one another through geometrical regularities, such as 90° angles. Path segments 28 situated opposite one another are standardly oriented parallel to one another. On the basis of these regularities, a correction can be carried out of the orientation of the path segments 28 relative to one another. This results in rectified, or corrected, path segments 29. This process is illustrated by the examples shown in FIGS. 6-8. Here, the points represent the respective points of maximum curvature 26 that bound the respective path segments 28, 29 at their ends.

Figure 9:
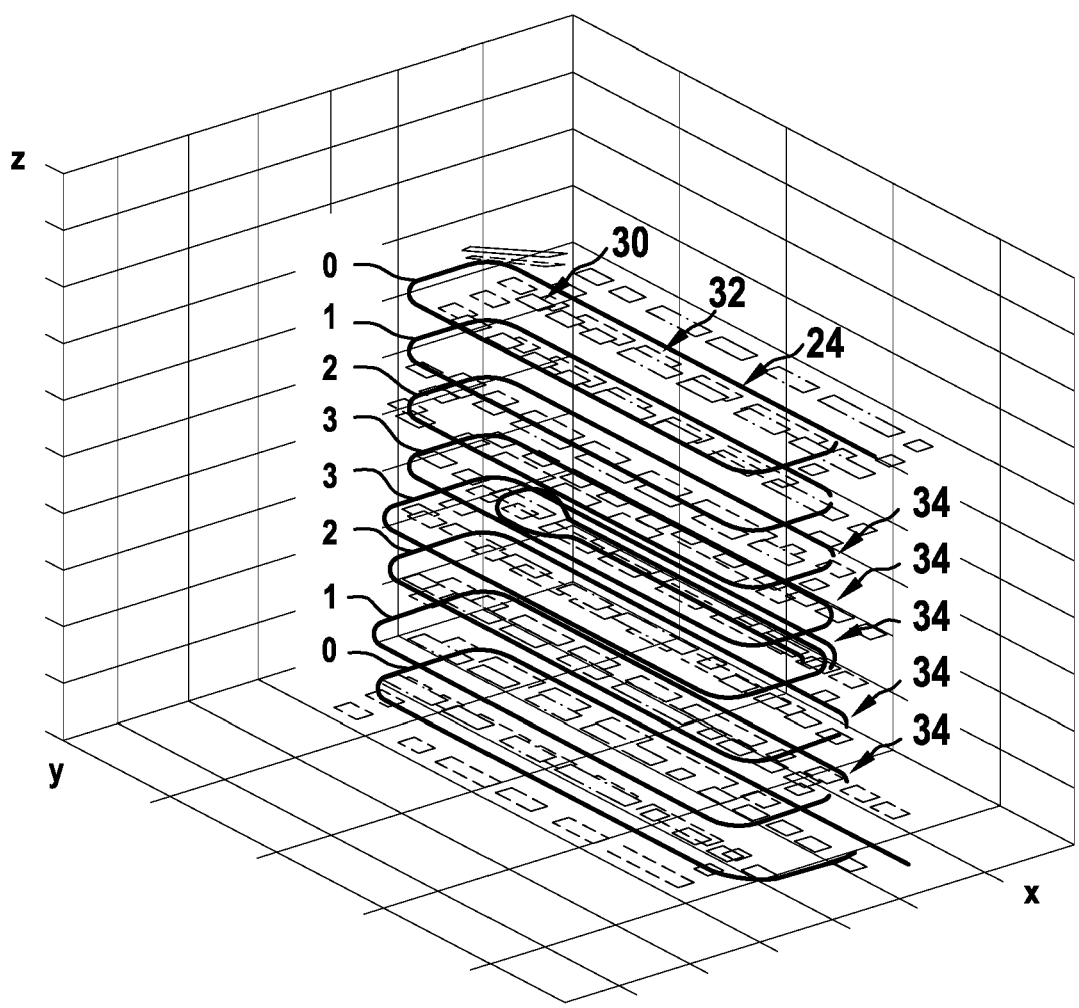
FIG. 9 shows a schematic representation of the comparison of items of environmental information from a plurality of sensors, in accordance with an example embodiment of the present invention.

FIG. 9 shows a schematic representation of the comparison of items of environmental information from a plurality of sensors 4, 6. According to the exemplary embodiment, vehicles or obstacles 30 situated on the left side, and obstacles 32 situated to the right of vehicle 2, are detected by sensors 4, 6. These obstacles 30, 32 are shown in the diagram along a path 24, at their respective location of detection.

Here, the rectified path segments 29 have been combined to form loops 34. Based on this step, regularities with regard to possible parking spaces 16 can be determined based on the detected obstacles 30, 32. According to the exemplary embodiment, each loop 34 forms a level z of parking infrastructure 14. The distribution of the occupation of parking spaces by obstacles 32, 34 is shown in the diagram.

The respective levels z of parking infrastructure 14 can in addition be estimated through segments having continuous obstacles, or without obstacles 30, 32.

In the following, the ascertaining of the regularities and the fusion of the items of environmental information from a plurality of measurement series, or from a plurality of trips of vehicles 2, is described.

A loop-specific regularity or signature is ascertained based on the preceding rectification steps, and can for example include the distribution of the possible parking spaces 16. On the basis of the ascertained points of maximum curvature 26, the paths 24 can be divided into different closed loops 34, which can each be made up of a plurality of segments 29.

The local maxima of points 26 can here represent entry points 36 and exit points 38 of the respective loop 34. This can be carried out for a multiplicity of trips, or items of path information 24, which are shown as an example in FIG. 10. Here, alternatively or in addition individual loop-specific rectifications can be carried out.

Obstacles 30, 32 along a multiplicity of path loops 34 can be collected and used for the recognition of free parking spaces 16. Because the parking spaces occupied by obstacles 30, 32 are marked as complementary to the free parking spaces 16, the generation of a state of occupancy of parking infrastructure 14 is enough to enable a judgment to be made about free parking spaces 16.

For each recognized obstacle 30, 32, a placeholder can be used that acts as a reference for a vehicle or for a static structure of parking infrastructure 14, such as columns. Based on the ascertained distance of obstacles 30, 32 from the measuring vehicle 2, the lateral distances between obstacles 30, 32 can also be taken into account.

The combining of a plurality of measurements of obstacles 30, 32, ascertained by different sensors 4, 6 or by different vehicles 2, can take place based on the ascertaining of a so-called intersection-over-union unit, or a Jaccard coefficient. In this way, measurement results that correlate strongly with one another, or obstacles 40, can be taken into account in the generation of the occupancy map. Other obstacles 42 that have a low degree of similarity or a low Jaccard coefficient can be removed.

Figure 10:
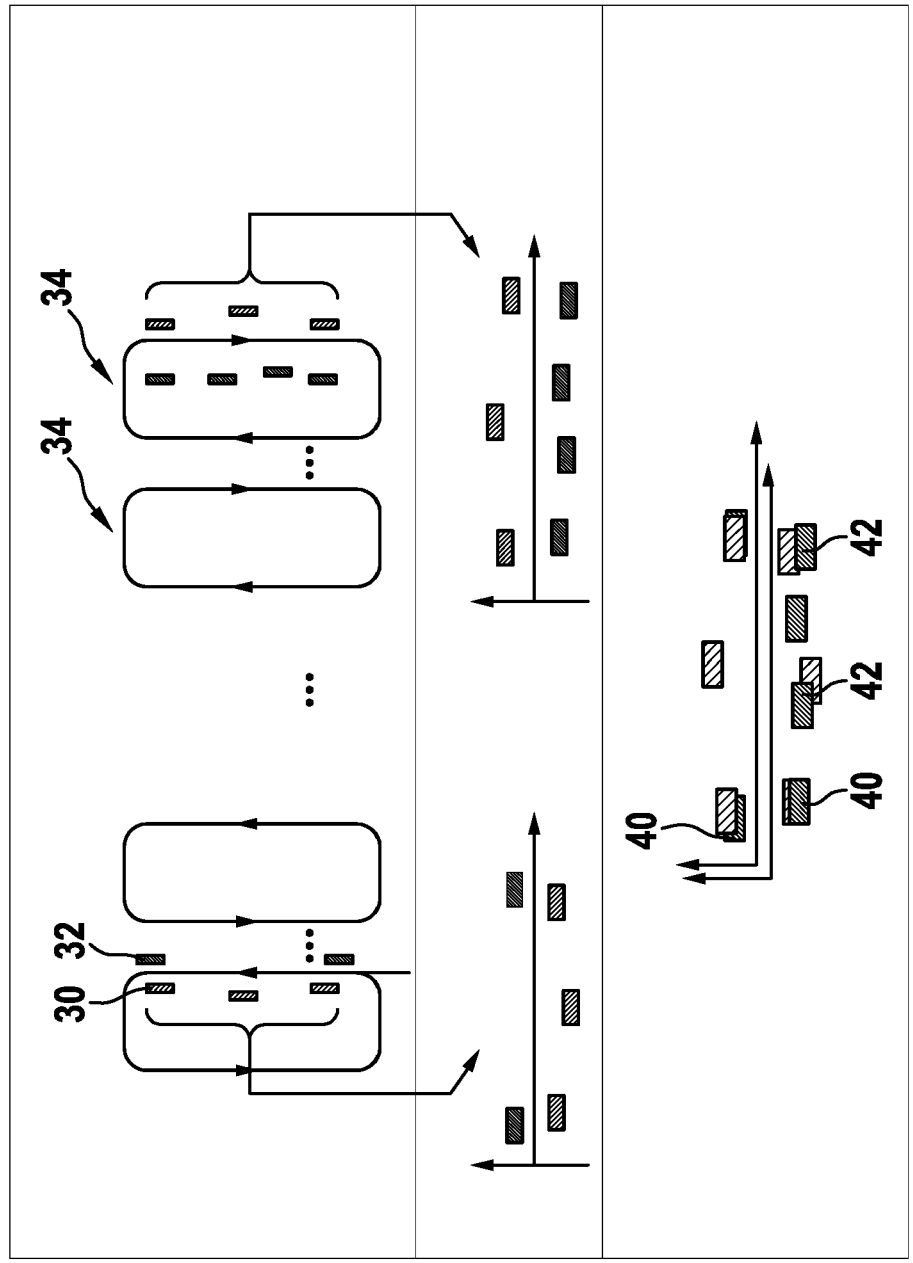
FIG. 10 shows a schematic diagram illustrating a spatial normalization of path information, in accordance with an example embodiment of the present invention.

In order to carry out the combination, the respective obstacles 30, 32 can be entered into a diagram in linear fashion along a path length L. Subsequently, obstacles 30, 32 from different diagrams can be superposed and compared to one another. These steps are illustrated in FIG. 10.

Figure 11:
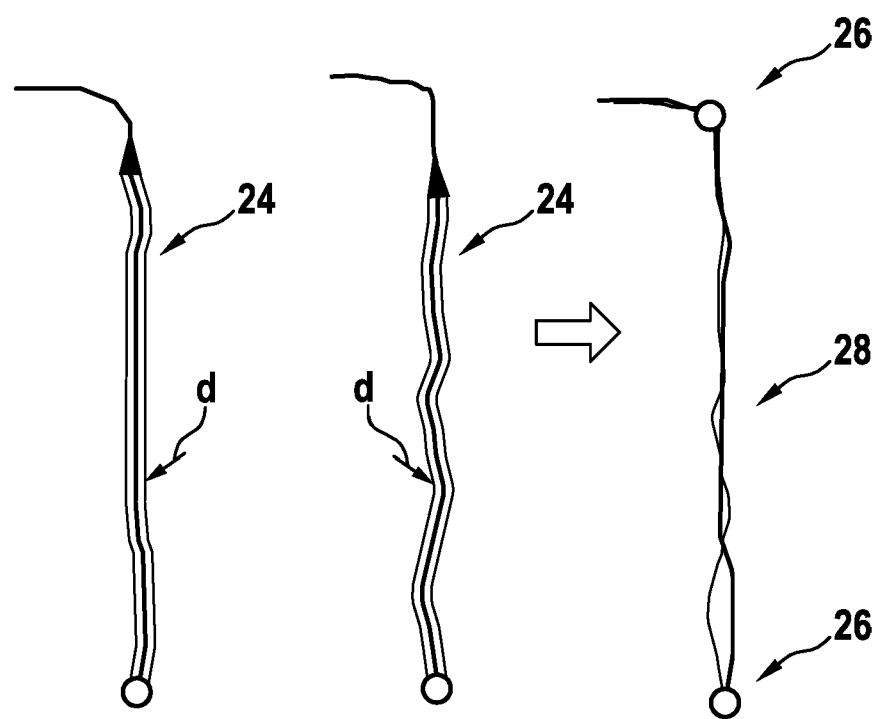
FIG. 11 shows representations illustrating the combination of a plurality of ascertained paths that are combined with one another segment-by-segment at the points of maximum curvature, in accordance with an example embodiment of the present invention.

FIG. 11 shows representations illustrating the combination of a plurality of ascertained paths 24 that are combined segment-by-segment at the points of maximum curvature. The respective paths 24 were recorded by different vehicles 2 and communicated to server unit 12. After ascertaining the points of maximum curvature 26, the respective path segments 28 of an infrastructure 14 are adapted to one another in their length d. Subsequently, the respective path segments 28 can be superposed or averaged.

The information and paths shown in the respective Figures can be ascertained through one or more measurements of vehicles 2. In the case of a plurality of measurements, the respective items of information can be coupled to one another and thus completed.

What is claimed is:

1. A method for creating a map of at least one parking infrastructure by a server unit, unoccupied parking spaces inside the parking infrastructure being registered, the method comprising the following steps:
   receiving, by the server unit, items of path information and items of environmental information ascertained by a vehicle sensor system of at least one vehicle about a path of the at least one vehicle;
   subdividing the path information into path segments;
   rectifying, by the external server unit, the path segments to compensate errors, and using the rectified path segments to create or update a geometrical map of the parking infrastructure; and
   based on the items of environmental information and based on the rectified path segments, acquiring occupied and unoccupied parking spaces along the path of the at least one vehicle to ascertain unoccupied parking spaces inside the parking infrastructure,
   wherein the rectified path segments are combined to form loops, wherein each loop of the loops form a vertical level of the parking infrastructure, wherein changes of a parking space level are determined based on the ascertained occupied and unoccupied parking spaces along the path of the at least one vehicle, and being taken into account in the creation or updating of the map, and wherein changes of a level in the environmental information are determined.

2. The method as recited in claim 1, wherein points in the items of path information having maximum curvature are ascertained, and the items of path information are subdivided into approximately linear path segments that are bounded by the points of maximum curvature.

3. The method as recited in claim 2, wherein the rectification of the path segments is carried out based on geometrical regularities of a plurality of the items of path information, the points of maximum curvature being defined as turning points having an angle, and being used for the rectification of the path segments.

4. The method as recited in claim 1, wherein a position of an entrance to the parking infrastructure is ascertained, and the items of path information are adapted to the position of the entrance in such a way that the items of path information begin at the position of the entrance.

5. The method as recited in claim 1, wherein the maximum curvature is ascertained by scanning the items of path information using a circle, a path of the path information being routed through a circle midpoint, and two vectors, between an entry point of the path of the path information into the circle and the circle midpoint and between the circle midpoint and an exit point of the path of the path information out of the circle, being used to ascertain the maximum curvature.

6. The method as recited in claim 1, a plurality of the items of path information are combined with one another at points of maximum curvature.

7. The method as recited in claim 1, wherein the ascertained geographical map and the ascertained unoccupied parking spaces are provided for retrieval.

8. The method as recited in claim 1, wherein ascertained items of environmental information from a plurality of vehicle sensors are fused using a calculation of similarity criteria.

9. The method as recited in claim 1, wherein the items of path information are ascertained using odometry measurement of the at least one vehicle.

10. An external server unit configured to create a map of at least one parking infrastructure by a server unit, unoccupied parking spaces inside the parking infrastructure being registered, the external server unit being configured to:
  receive items of path information and items of environmental information ascertained by a vehicle sensor system of at least one vehicle about a path of the at least one vehicle;
  subdivide the path information into path segments;
  rectify the path segments to compensate errors, and use the rectified path segments to create or update a geometrical map of the parking infrastructure; and
  based on the items of environmental information and based on the rectified path segments, acquire occupied and unoccupied parking spaces along the path of the at least one vehicle to ascertain unoccupied parking spaces inside the parking infrastructure,
  wherein the rectified path segments are combined to form loops, wherein each loop of the loops form a vertical level of the parking infrastructure, wherein changes of a parking space level are determined based on the ascertained occupied and unoccupied parking spaces along the path of the at least one vehicle, and being taken into account in the creation or updating of the map, and wherein changes of a level in the environmental information are determined.

11. A system, comprising:
  at least one vehicle each having a vehicle sensor system including at least one environmental sensor, at least one odometer, and a control device for receiving and evaluating sensor data of the vehicle sensor system; and
  at least one external server unit configured to create a map of at least one parking infrastructure by a server unit, unoccupied parking spaces inside the parking infrastructure being registered, the external server unit being configured to:
    receive items of path information and items of environmental information ascertained by the vehicle sensor system of the at least one vehicle about a path of the at least one vehicle,
    subdivide the path information into path segments,
    rectify the path segments to compensate errors, and use the rectified path segments to create or update a geometrical map of the parking infrastructure, and
    based on the items of environmental information and based on the rectified path segments, acquire occupied and unoccupied parking spaces along the path of the at least one vehicle to ascertain unoccupied parking spaces inside the parking infrastructure,
    wherein the rectified path segments are combined to form loops, wherein each loop of the loops form a vertical level of the parking infrastructure, wherein changes of a parking space level are determined based on the ascertained occupied and unoccupied parking spaces along the path of the at least one vehicle, and being taken into account in the creation or updating of the map, and wherein changes of a level in the environmental information are determined.

* * * * *